United States Patent [19]

Toyooka et al.

[11] Patent Number: 5,159,520

[45] Date of Patent: Oct. 27, 1992

[54] SEMICONDUCTOR INTEGRATED CIRCUIT HAVING FUNCTION OF PREVENTING RISE OF SURFACE TEMPERATURE

[75] Inventors: Tamotsu Toyooka, Itabashi; Yoshiki Shibata, Yotsukaido, both of Japan

[73] Assignee: Sharp Kabushiki Kaisha, Osaka, Japan

[21] Appl. No.: 738,873

[22] Filed: Aug. 1, 1991

[30] Foreign Application Priority Data

Aug. 3, 1990 [JP] Japan .................................. 2-207384

[51] Int. Cl.⁵ .............................................. H02H 5/04
[52] U.S. Cl. ...................................... 361/103; 361/55; 361/104; 357/28; 307/310
[58] Field of Search .................. 357/23.13, 41, 40, 28; 361/103, 86, 78, 104, 55; 307/310, 296.6

[56] References Cited

U.S. PATENT DOCUMENTS

| | | | |
|---|---|---|---|
| 4,667,265 | 5/1987 | Stanojevic et al. | 361/103 |
| 4,760,434 | 7/1988 | Tsuzuki et al. | 357/23.13 |
| 4,924,112 | 5/1990 | Anderson et al. | 307/310 |

Primary Examiner—A. D. Pellinen
Assistant Examiner—C. Schultz
Attorney, Agent, or Firm—David G. Conlin; Robert F. O'Connell

[57] ABSTRACT

A semiconductor integrated circuit includes a semiconductor chip having a predetermined circuit device and a PN junction diode group formed on the surface thereof. The PN junction diode group is supplied with a constant current in the forward direction, whereby the potential difference between the terminals thereof changes according to the surface temperature of the semiconductor chip. A potential difference generating circuit generates a fixed potential difference corresponding to a predetermined limit temperature of the chip surface, whereby the potential difference between the terminals of the PN junction diode group is compared with the fixed potential difference. As a result, when the determination in made that the temperature of the semiconductor chip surface reaches the limit temperature, the operation of the circuit device is temporarily or completely halted.

2 Claims, 4 Drawing Sheets

SEMICONDUCTOR INTEGRATED CIRCUIT HAVING FUNCTION OF PREVENTING RISE OF SURFACE TEMPERATURE

BACKGROUND OF THE INVENTION

1. Field of the Invention

The present invention relates to semiconductor integrated circuits, and more particularly, to a semiconductor integrated circuit that can prevent the temperature of the surface of a semiconductor chip from rising excessively.

2. Description of the Background Art

The consumption current of semiconductor integrated circuits such as video signal processing semiconductor integrated circuits used in high definition television (HDTV) equipments is increasing these recent years due to the large scale integration and higher operation speed. The operating temperature of the semiconductor integrated circuit usually rises during its use due to such large consumption current. As a result, the temperature of the semiconductor chip surface sometimes becomes higher than the permissible limit temperature (approximately 150° C.). If the semiconductor chip is left in a state where the surface temperature thereof in higher than the limit temperature, defect may occur in the circuit device. This may also cause accident such as fire and the like. approaches such as providing a radiating plate in the semiconductor integrated circuit have been taken to reduce the rise of temperature in such semiconductor chips.

A semiconductor integrated circuit comprising a PN junction diode as a temperature sensor is disclosed in Japanese Patent Laying-Open Nos. 59-163528 and 59-166826, for example. However, there were no positive approaches taken to reduce the surface temperature of the semiconductor chips or to warn the user of the rise in temperature using the detected output of the temperature sensor.

Conventional semiconductor integrated circuits does not have means to detect the surface temperature of the semiconductor chip for notifying the detected temperature to the user or for automatically reducing the temperature of the surface itself. There is the possibility of defect in the circuit device or occurrence of accidents such as fire due to the rise in temperature of the chip surface when the semiconductor integrated circuit is operated continuously.

SUMMARY OF THE INVENTION

An object of the present invention is to provide a semiconductor integrated circuit that can prevent defect in a circuit device and accidents such as fire, even if the surface temperature of the semiconductor chip rises above a limit temperature.

Another object of the present invention is to provide a semiconductor integrated circuit that can temporarily or completely halt the operation of a circuit device when the surface temperature of the semiconductor chip rises above a limit temperature.

A further object of the present invention is to provide a semiconductor integrated circuit that can warn the user that the surface temperature of the semiconductor chip has excessively risen to exceed a limit temperature.

Briefly, the present invention is a semiconductor integrated circuit including a semiconductor chip, a PN junction diode group, a constant current source circuit, a potential difference generating circuit, a comparator and an input/output buffer. A predetermined circuit device is formed on the surface of the semiconductor chip. The PN junction diode group is provided on the semiconductor chip. The constant current source circuit supplies constant current in the forward direction to the PN junction diode group. The potential difference generating circuit generates a potential difference corresponding to a potential difference known in advance between both ends of the PN junction diode group at a predetermined limit temperature of the semiconductor chip surface. The comparator compares the potential difference between both ends of the PN junction diode group with that generated by the potential difference generating circuit to generate a signal indicating the result thereof. The input/output buffer responds to the output signal of the comparator to halt the operation of the circuit device when determination is made that the temperature of the semiconductor chip surface has increased to reach a limit temperature.

According to another aspect of the present invention, a semiconductor integrated circuit includes a light emitting diode responsive to the output of the comparator to notify the user that the surface temperature of the semiconductor chip has increased to reach a limit temperature.

The main advantage of the present invention is to prevent various defects due to excessive rise in the surface temperature of a chip by automatically halting the operation of the semiconductor integrated circuit or by warning the user when the surface temperature of the semiconductor chip exceeds a limit temperature.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The embodiments of the present invention will be explained hereinafter with reference to the drawings.

Figure 1:
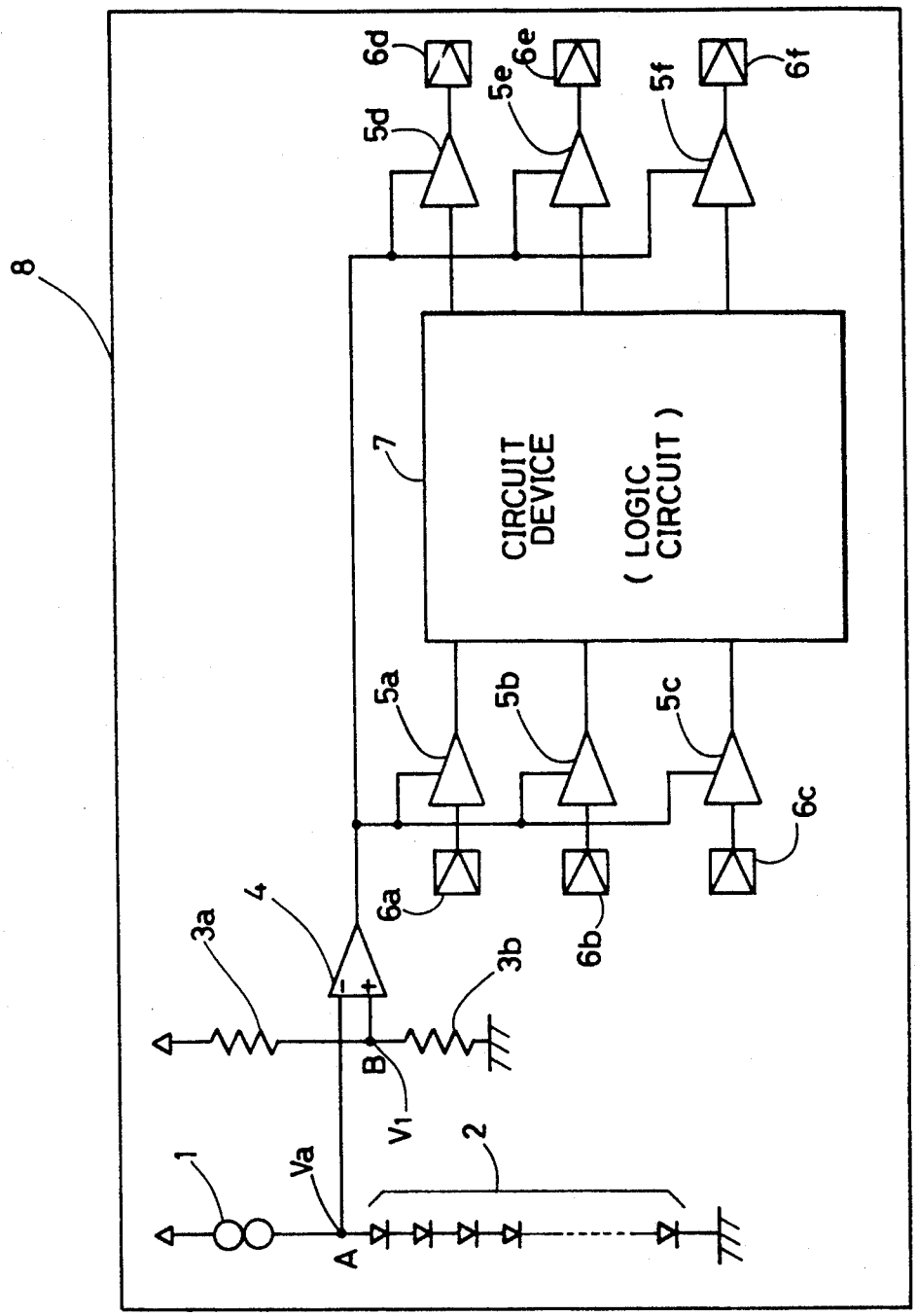
FIG. 1 is a block diagram of a semiconductor integrated circuit according to a first embodiment of the present invention.

FIG. 1 is a block diagram of a semiconductor integrated circuit according to a first embodiment of the present invention. Referring to FIG. 1, a PN junction diode group (rectifying means) 2 formed of n (n is a positive integer) PN junction diodes connected in series is connected between a constant current source (constant current source means) 1 and ground potential on a semiconductor chip 8. Constant current source circuit 1 supplies constant current to PN junction diode group 2 in the forward direction. The potential at node A is assumed to be Va.

Potential V1 in node B is defined by resistors 3a and 3b (potential difference generating means) connected in series between power supply potential and ground potential. It is assumed that V1 is set to be equal to the known potential difference between the terminals of PN junction diode group 2 when the above described forward constant current crosses PN junction diode group 2 where the semiconductor chip surface is at a predetermined limit temperature (150° C.).

Figure 4:
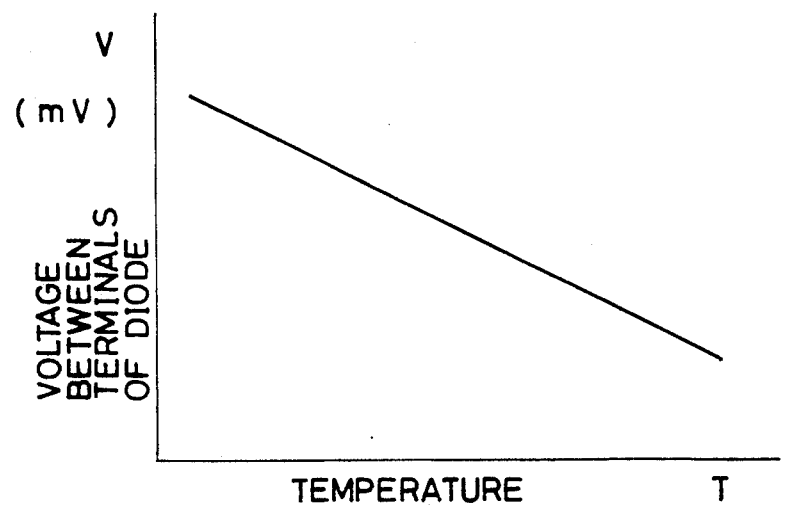
FIG. 4 is a graph showing the temperature characteristic of an PN junction diode.

Generally, the diode has a unique temperature characteristic. Particularly, the PN junction diode of FIG. 1 has a temperature coefficient of approximately $-2$ mV/°C. This characteristic is shown in the graph of FIG. 4. Referring to FIG. 4, the ordinate indicates the voltage V between the terminals of the diode. The abscissa indicates the temperature T. The temperature coefficient of $-2$ mV/°C. means that the potential difference between the terminals of the diode decreases by 2 mV for every 1° C. rise in temperature when current flows in the forward direction of the PN junction diode, as shown in FIG. 4.

If the potential difference V1 between the terminals of the PN junction diode group 2 at a predetermined limit temperature T1 is known according to the above described temperature characteristic, the excess of the chip surface temperature above the limit temperature can be detected by comparing the current voltage Va between the terminals of the PN junction diode group 2 on the surface of the chip with the above described V1 using a comparator. In other words, a current potential difference Va between the terminals of the diode group 2 lower than V1 means that the chip surface temperature has exceeded the limit temperature.

In the embodiment of FIG. 1, a comparator 4 compares the above described Va with V1 to determine the magnitude relation of the two potentials. Va is assumed to be Vi when the integrated circuit is at the halted state. Upon the start of the operation of the semiconductor integrated circuit, the chip surface temperature rises over time, whereby the potential difference between terminals decreases by Vt for one PN junction diode. In other words, Va is expressed by $Va = Vi - nVt$. When Va is higher than V1, comparator 4 generates an output of an L level indicting that the surface temperature has not reached the limit temperature. If the chip surface temperature further rises so that $Va = Vi - nVt$ becomes lower than V1, the output of comparator 4 changes from the L level to an H level indicating that the surface temperature has reached the limit temperature.

A circuit device 7 formed of logic circuits or the like is provided on semiconductor chip 8. Inputs to the chip from external sources are supplied to circuit device 7 via pads 6a, 6b and 6c, and input buffers 5a, 5b and 5c. The outputs from circuit device 7 are provided to an outside of the chip via output buffers 5d, 5e and 5f, and pads 6d, 6e and 6f.

Each of input/output buffers 5a-5f of FIG. 1 is a two-input buffer, where the operation thereof is controlled by the control output from comparator 4. In other words, each input/output buffer is activated if L level signal is provided from comparator 4, and each input/output buffer is disabled when H level signal is provided from comparator 4.

Because L level signal is provided from comparator 4 until the chip surface temperature exceeds the limit temperature, input/output buffers 5a-5f are activated so that circuit device 7 carries out normal operation. When consumption current increases so that the chip surface temperature reaches the limit temperature, the output of comparator 4 changes from the L level to the H level, whereby input/output buffers 5a-5f are disabled simultaneously. As a result, an external signal is not supplied to circuit device 7. The current flowing in the circuit is only the standby current. This causes the consumption current to be reduced, so that the chip surface temperature drops down. When the surface temperature becomes lower than the limit temperature, Va will become greater than V1 again, whereby the output of comparator 4 changes to L level. Accordingly, input/output buffers 5a-5f are activated so that circuit device 7 commences normal operation again.

The first embodiment of the present invention detects the excess of the chip surface temperature over a limit temperature to temporarily disable the input/output buffers without damaging the circuit itself. Problems encountered due to rise in the chip temperature can be eliminated. The circuit device can automatically restart normal operation when the chip surface temperature drops down.

Figure 2:
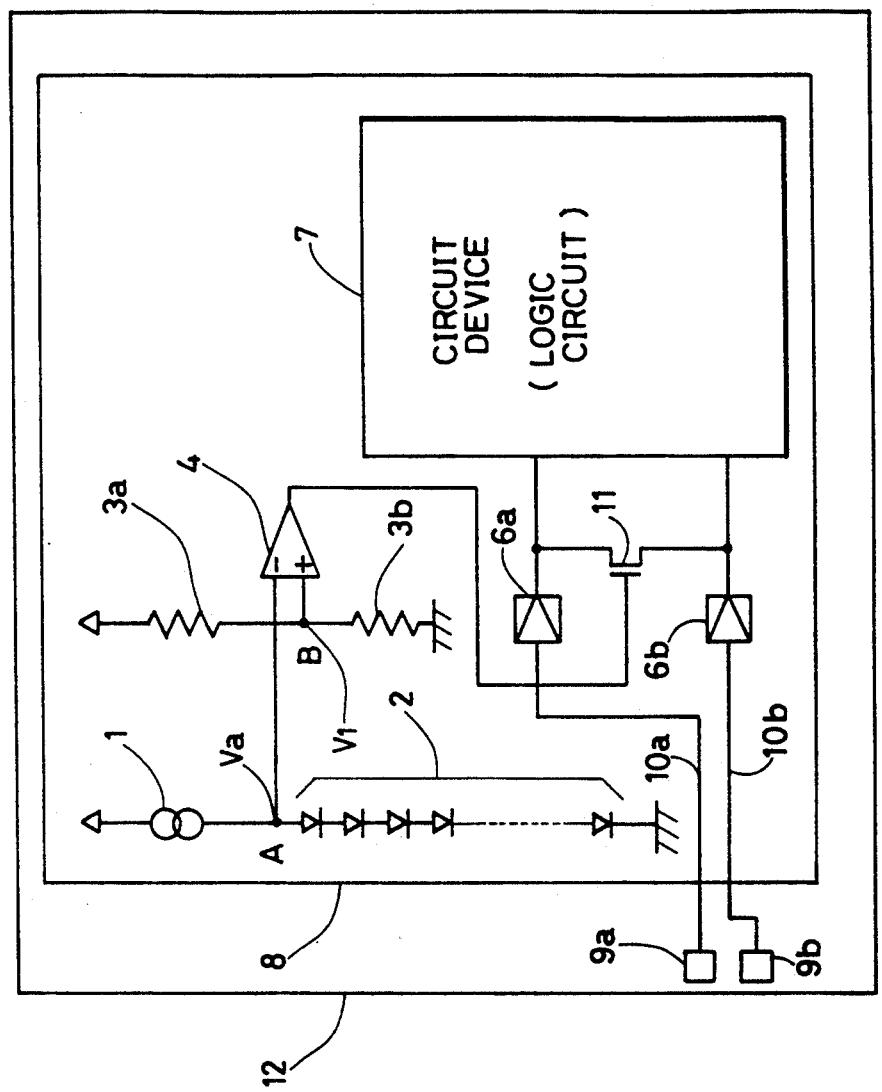
FIG. 2 is a block diagram of a semiconductor integrated circuit according to a second embodiment of the present invention.

FIG. 2 is a block diagram of a semiconductor integrated circuit according to a second embodiment of the present invention. The semiconductor integrated circuit of FIG. 2 is similar to that of FIG. 1 except for the following points. Semiconductor chip 8 is supported by a frame 12. A terminal 9a supplied with ground potential is connected to pad 6a via a gold wire 10a. A terminal 9b supplied with power supply potential is connected to pad 6b via a gold wire 10b. Circuit device 7 is supplied with power via pads 6a and 6b. Furthermore, an N channel FET 11 is provided having a source connected to pad 6a and a drain connected to pad 6b. The gate thereof is supplied with the output of comparator 4 as the control input. The operation of comparator 4 is identical to that of the first embodiment of FIG. 1, where an L level signal is provided until the chip surface temperature reaches a limit temperature, and then an H level signal when the limit temperature is reached.

When the chip surface temperature is below the limit temperature so that the output of comparator 4 is at the L level, FET 11 is in an off state so that the supply of power to circuit device 7 is carried out normally. When the chip surface temperature rises to reach the limit temperature, the output of comparator 4 changes to the H level, whereby FET 11 is turned on. This causes pad 6a to be shorted to pad 6b. As a result, large current flows across gold wires 10a and 10b to disconnect these gold wires. Therefore, the supply of power from external terminals 9a and 9b to circuit device 7 is cut off to halt the operation of circuit device 7. Accordingly, the chip surface temperature drops down.

The second embodiment of the present invention completely disconnects the supply line of power to the circuit device by means of high current when the excess of the chip surface temperature over the limit temperature is detected. Therefore, various problems due to chip surface temperature rise are solved.

Figure 3:
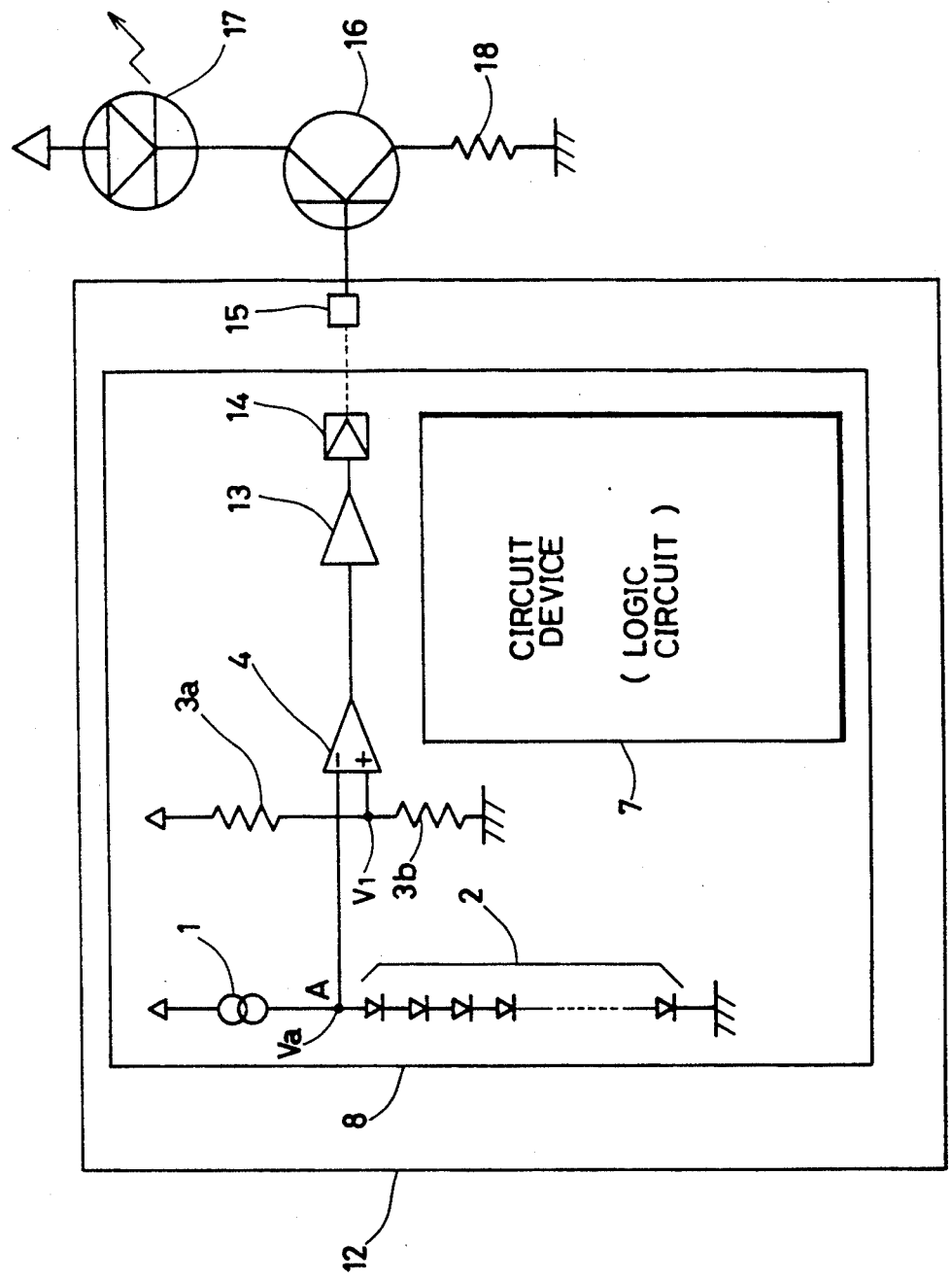
FIG. 3 is a block diagram of a semiconductor integrated circuit according to a third embodiment of the present invention.

FIG. 3 is a block diagram of a semiconductor integrated circuit of a third embodiment of the present invention. The semiconductor integrated circuit of FIG. 3 is similar to that of FIG. 1 except for the following points. The third embodiment of FIG. 3 has the output of comparator 4 provided to a terminal 15 outside the chip via buffer 13 and pad 14 irrespective of the operation of circuit device 7 in the chip. This differs from the first embodiment of the FIG. 1 where the operation of each input/output buffer is controlled by the output of comparator 4, and from the second embodiment of FIG. 2 where the ON/OFF of the FET is controlled by the output of comparator 4. External terminal 15 is connected to the base of a bipolar transistor 16. A light emitting diode 17 is connected between the collector of bipolar transistor 16 and the constant current source. A resistor 18 determining current crossing light emitting diode 17 is connected between the emitter of bipolar transistor 16 and ground potential. The operation of comparator 4 is identical to those of the embodiments of FIGS. 1 and 2, where an L level signal is provided until the chip surface temperature reaches the limit temperature, and then an H level signal thereafter.

In the situation where the chip surface temperature has not yet reached the limit temperature and the output of comparator 4 is at the L level, bipolar transistor 16 is in the off state, so that current does not flow through light emitting diode 17. Accordingly, light emitting diode 27 does not emit light. When the chip surface temperature rises to reach the limit temperature, the output of comparator 4 changes to the H level to turn on bipolar transistor 16. As a result, current flows through light emitting diode 17, whereby light emitting diode 17 emits light to notify the user that the chip surface temperature has exceeded over the limit temperature. The notified user carries out operation to halt the operation of the semiconductor integrated circuit. Accordingly, the chip surface temperature drops down.

A buzzer may be provided instead of light emitting diode 17 to warn the user audibly.

The third embodiment of the invention has an external terminal for providing a detection signal indicating the excessive rise of the chip surface temperature over a limit temperature to the outside of the chip. By providing this detected signal to some warning device, the user is notified that the temperature of the chip surface has exceeded over a limit temperature to take appropriate measures.

Figure 5:
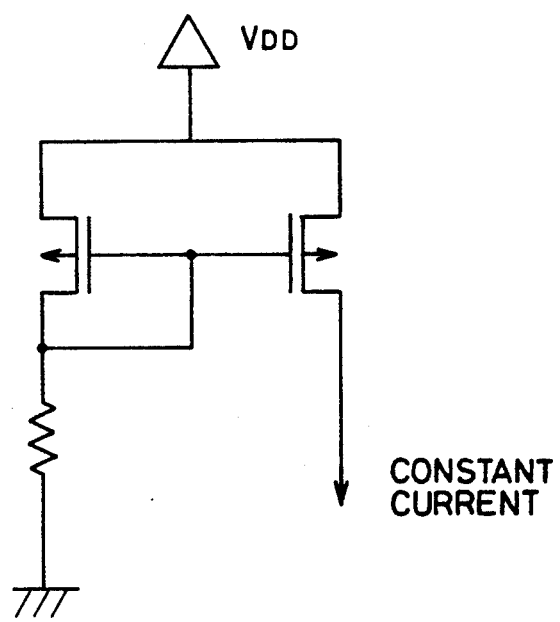
FIG. 5 is a circuit diagram of a current mirror circuit as an example of a constant current source circuit.

A current mirror circuit shown in FIG. 5 can be used as constant current source circuit 1 in the above-described first, second and third embodiments.

According to the present invention, the operation of the semiconductor integrated circuit is automatically halted or the user is notified, when the semiconductor chip surface temperatures exceeds the limit temperature. Therefore, various accidents due to excessive rise in the chip surface temperature can be prevented.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor integrated circuit comprising:
a semiconductor chip having a predetermined circuit device formed on the surface thereof,
rectifying means having a PN junction, provided on said semiconductor chip,
constant current source means for supplying a constant current to said rectifying means in the forward direction,
potential difference generating means for generating a potential difference corresponding to a known potential difference between both sides of said rectifying means at a predetermined limit temperature of said semiconductor chip surface,
comparing means for comparing said potential difference between both sides of said rectifying means with said potential difference generated by said potential difference generating means to generate a signal indicating the comparison result, and
operation halting means responsive to the output signal of said comparing means for halting the operation of said circuit device when determination is made that the temperature of said semiconductor chip surface has risen to reach said limit temperature, said operation halting means comprising temporary halting means responsive to the output signal of said comparing means for halting temporarily the operation of said circuit device until the temperature of said semiconductor chip surface becomes lower than said limit temperature, said temporary halting means comprising input buffer means connected between said circuit device and input terminals of said circuit device and output buffer means connected between said circuit device and output terminals of said circuit device, respectively, to be temporarily disabled in response to the output signal of said comparing means.

2. A semiconductor integrated circuit comprising:
a semiconductor chip having a predetermined circuit device formed on the surface thereof,
rectifying means having a PN junction, provided on said semiconductor chip,
constant current source means for supplying a constant current to said rectifying means in the forward direction,
potential difference generating means for generating a potential difference corresponding to a known potential difference between both sides of said rectifying means at a predetermined limit temperature of said semiconductor chip surface,
comparing means for comparing said potential difference between both sides of said rectifying means with said potential difference generated by said potential difference generating means to generate a signal indicating the comparison result,
operation halting means responsive to the output signal of said comparing means for halting the operation of said circuit device when determination is made that the temperature of said semiconductor chip surface has risen to reach said limit temperature, said operation halting means including means for permanently disabling the operation of said circuit device, irrespective of the temperature of said semiconductor chip surface, after the temperature of said semiconductor chip surface once reaches said limit temperature, said disabling means comprising means for supplying power to said circuit device, and switching means responsive to the output signal of said comparing means for disconnecting said power supplying means from said circuit device,
said power supplying means comprising
a first metal interconnection for connecting said circuit device to an external ground potential, and
a second metal interconnection for connecting said circuit device to an external power supply potential, and
said switching means comprising
a semiconductor switching element connected between said first and second metal interconnections, responsive to the output signal of said comparing means for providing a short-circuit between said first metal interconnection and said second metal interconnection.

* * * * *